3,267,060
LATEX OF ETHYLENE PROPYLENE COPOLYMER

Stearns T. Putnam and Harold M. Spurlin, Wilmington, Del., assignors to Hercules Powder Company, Wilmington, Del., a corporation of Delaware
No Drawing. Filed Oct. 27, 1960, Ser. No. 65,271
6 Claims. (Cl. 260—29.6)

This invention relates to high solids latices of ethylene propylene copolymers, and to the use of same as coating adhesives in paper coating color compositions.

In the preparation of a coated paper it is conventional to use an aqueous dispersion of a pigment and an adhesive, known in the art as a coating color composition. The usual coating color pigment is clay, and the usual adhesive is either starch or casein. These so-called natural adhesives (starch and casein) suffer from several deficiencies. For example, they are very water sensitive and form a brittle glue line when dry. In addition, a coating color containing one of them as the sole adhesive will be quite viscous at high solids content, therefore limiting the speed at which it can be applied to paper.

It has now been discovered that high solids latices prepared from ethylene propylene copolymers, when used in conjunction with natural adhesives or alone as the adhesive in a coating color composition, result in a coating color of lowered viscosity and a coated paper of increased water resistance and improved gloss.

Accordingly, this invention relates to a high solids ethylene propylene copolymer latex, a paper coating color comprising an aqueous dispersion of substantial quantities of a pigment and an adhesive, said adhesive containing at least 10% by weight of a latex of an ethylene propylene copolymer, and to paper, paperboard, and the like, coated with said coating color.

The ethylene propylene copolymers useful in the practice of this invention are the normally solid copolymers. These copolymers are materials known to the art which can be prepared by copolymerizing ethylene with propylene by any of several methods, such as the methods described in Belgian Patents 535,082; 538,782; 553,655; and 583,039; and, U.S. Patents 2,700,663 and 2,726,231. Those copolymers containing from about 20 to about 45 mole percent propylene and having a reduced specific viscosity (RSV) of from about 1.0 to about 7 are most useful in this invention.

The term "reduced specific viscosity," which is a function of molecular weight, is used herein to designate the $\eta sp./C.$ determined on a 0.1% solution of the copolymer in decahydronaphthalene measured at 135° C.

The latices of ethylene propylene copolymers of this invention can be prepared by any one of a number of procedures. One convenient procedure is to prepare a solution of the ethylene propylene copolymer in an organic solvent and then form an emulsion by mixing with water and a small amount of surface-active agent, i.e., an anionic surface-active agent such as potassium oleate, sodium laurylsulfate, etc.; a nonionic surface-active agent such as nonylphenol ethylene oxide, sorbitan trilaurate, polyoxyethylene lauryl alcohol adduct, etc.; or a mixture of an anionic and a nonionic surface-active agent. The emulsion can then be stripped of the organic solvent or solvents by steam distillation to give a dilute latex. The latex can then be concentrated by known methods. Latices having various total solids compositions can be prepared; however, the total solids composition will usually be from about 40% to about 60% solids.

As stated before, a conventional coating color contains a pigment and an adhesive dispersed in water. Usually a mixture of water and a pigment, such as clay or the like, optionally together with other materials, such as, for example, a soluble pyrophosphate which can act as a stabilizing agent, is first prepared. This mixture, otherwise known as a pigment slip or, since it generally contains clay, as a clay slip, is then compounded with a binder or adhesive material, such as starch, to produce a coating color composition. Considerable quantities of the adhesive are used, and, accordingly, its composition and characteristics are of great importance in determining the quality of the finished paper. Important properties of the adhesive are that they must impart to the finished paper a high degree of brightness, smoothness and gloss, and a good finish and feel after calendering. In addition to these basic qualities, there are various other characteristics that go far toward determining the value and utility of coating adhesives (1) the coating color must flow smoothly and evenly so that it may be applied to paper at sufficiently high speeds to be economical in ordinary coating processes, (2) the coating must have high strength to permit subsequent printing on the coated paper without "picking," and (3) the coating must resist moisture.

Now, in accordance with the present invention, there is utilized as a coating adhesive a composition of matter comprising a latex of an ethylene propylene copolymer. This latex is mixed with a pigment slip and, optionally, other ingredients to form a coating color which, when coated on a paper surface, provides brightness, smoothness and gloss, a good finish and feel after calendering, high strength and resistance to moisture.

For optimum results in the coating of paper, it is preferred to prepare a coating color having a total solids composition which is relatively high, thus combining surface coating qualities with economical operations. Since the latices of this invention reduce the viscosity of coating colors, it is possible to use higher solids colors and, hence, to coat at a faster rate without increasing the drying capacity of the machine. A preferred range of total solids for the coating color is between about 30% and about 70% solids with an optimum value of from about 50% to about 65%. If the latex is used as the sole adhesive in the coating color, it will be present in an amount between about 5% and about 20% based on the weight of clay, and preferably between about 8% and about 15%. A composition containing an amount of total solids and adhesive in this range is characterized by being readily applied to the surface of paper and by forming a highly resistant coating thereon. Thus, utilizing the coating color according to this invention, there is produced a coated paper which is highly satisfactory for use in printing operations and is resistant to disturbance of the coated surface through rubbing, picking, and the like. The latices of this invention can be used as the sole adhesive or merely to replace a part of the adhesive (starch or casein) in a conventional coating color. Where the latices are used to replace a part of the starch or casein in a conventional coating color, they will be present in an amount of at least about 10% by weight based on total adhesives.

In place of the clay utilized as the pigment, there can be used other paper coating compositions and materials such as, for example, calcium carbonate, titanium dioxide, or other coating pigments alone or preferably with a clay base. The modification of the coating color using these materials will be within the knowledge of those skilled in the art.

The utility of the coating color is not limited to the type of paper pulp used, and, accordingly, it can be utilized with the various types of kraft, soda, sulfite pulp, and the like, as well as with the various chemical and semi-chemical paper pulps. By the same token, the invention can be utilized with various types of paper products such as paper, paperboard, and the like. In all instances, the product produced is characterized by being relatively resistant to abrasion and having a surface of improved printing properties.

The general nature of the invention having been set forth hereinbefore, the following examples are presented for purposes of illustration, parts and percentages being by weight unless otherwise stated.

Example 1

An ethylene propylene copolymer having an RSV of 2.3 and a propylene content of 20.5 mole percent was prepared in chlorobenzene using a catalyst of aluminum diethyl chloride and tert. butyl ortho vanadate. The resulting chlorobenzene solution had a solids content of approximately 5%.

An emulsion was prepared by adding 10 parts of a 20% aqueous solution of an alkyl sulfate anionic surface-active agent to 225 parts of the above chlorobenzene solution. After vigorously agitating one minute, 75 additional parts of water were added and the water-in-oil emulsion inverted to form an oil-in-water emulsion, which was agitated an additional 5 minutes. From this emulsion a dilute latex was formed by steam stripping the chlorobenzene. The resulting latex had a solids content of 4.38% and an average particle size of <0.5 micron. It was concentrated by mixing with 10% of a 1% aqueous solution, based on the total volume of latex, of carboxymethylcellulose and allowed to stand overnight. Two layers formed. The bottom layer, essentially water, was removed leaving a latex containing 51.2% solids.

A clay slip was prepared by mixing 140 parts of fine kaolin coating clay with 60 parts of water containing 0.6 part sodium pyrophosphate. After agitating several minutes, a smooth suspension was obtained. To 70 parts of the clay slip was added 19.5 parts of the above latex and a small amount of anticoagulant to yield a smooth coating color composition containing 60% solids.

The thus prepared composition was coated on several sheets of book-ledger raw stock at the rate of 5 lbs./ream using a standard paper coating machine and dried on a drum drier to a moisture content of 5%. The resulting coated paper had better wet-rub resistance, better flexibility, better gloss, and better printability than a similar coated paper in which starch alone was used as the adhesive.

Wet-rub resistance is determined by rubbing a moistened surface across a coated paper and then placing the surface against a piece of black paper. The amount of coating color which is rubbed off the paper onto the test surface and subsequently transferred to the black paper is a qualitative indication of the wet-rub resistance of the paper.

Example 2

An ethylene propylene copolymer having an RSV of 1.3 and a propylene content of 25 mole percent was prepared in a mixed aliphatic and alicyclic solvent having a boiling range of 94–99° C. and a specific gravity of 0.731 using a catalyst of aluminum diethyl chloride and tert. butyl ortho vanadate. The resulting solution had a solids content of approximately 10%. An emulsion was prepared by adding 10 parts of a 15% aqueous solution of an alkyl sulfate anionic surface-active agent to 175 parts of the above copolymer solution. After vigorously agitating for 5 minutes, 100 additional parts of water were added and the water-in-oil emulsion inverted to form an oil-in-water emulsion which was stirred for an additional 10 minutes. From this emulsion a dilute latex was formed by steam stripping the solvent. The resulting latex had a solids content of 6.12% and an average particle size of <0.5 micron. It was concentrated by mixing with 10% of a 1% aqueous solution, based on the total volume of latex, of carboxymethylcellulose and allowed to stand overnight. Two layers formed. The bottom layer, essentially water, was removed leaving a latex containing 55.1% solids. This latex was added to a clay slip and then coated on paper as described in Example 1. The resulting coated paper had better wet-rub resistance, better flexibility, better gloss, and better printability than a similar coated paper in which starch alone was used as the adhesive.

Example 3

An ethylene propylene copolymer having an RSV of 2.0 and a propylene content of 26.2 mole percent was prepared in a mixed aliphatic and alicyclic solvent (described in Example 2), using a catalyst of tert. butyl ortho vanadate and aluminum diethyl chloride. The resulting solution, having a solids content of approximately 10%, was diluted with the mixed solvent to 5.12% solids. This copolymer solution was converted to a latex containing 45.3% solids as described in Example 2, added to a clay slip, and then coated on paper as described in Example 1 except that the coating rate was increased to 8 lbs./ream. The resulting coated paper had better wet-rub resistance, better flexibility, better gloss, and better printability than a similar coated paper in which starch alone was used as the adhesive.

Example 4

The latex described in Example 3 was used to replace 20% of the starch in a conventional starch clay coating color composition by the following procedure: To 80 parts of water at 95° C. was added 20 parts of starch. After agitating 10 minutes, a smooth starch solution resulted. To 143 parts of clay slip, prepared as described in Example 1, was added 80 parts of the above starch solution and the mixture agitated until smooth. To this starch-clay mixture was then added 11 parts of the latex described in Example 3 and a small amount of anticoagulant. After agitation to insure uniform distribution, the resulting composition was coated on paper as described in Example 1.

A second coating color composition was prepared in a similar manner using starch as the sole adhesive, and it was coated on paper as described in Example 1. The paper coated with the composition containing ethylene propylene copolymer latex had better wet-rub resistance and higher gloss than the paper coated with the composition prepared with starch alone.

Example 5

An ethylene propylene copolymer having an RSV of 6.5 and a propylene content of 28.3 mole percent was prepared in a mixed aliphatic and alicyclic solvent (described in Example 2), using a catalyst of aluminum sesquichloride and tert. butyl ortho vanadate. The resulting solution had a solids content of approximately 6.1% solids.

An emulsion was prepared by adding 3.4 parts of an alkyl sulfate anionic surface-active agent, dissolved in 217 parts of water, to 350 parts of the above copolymer solution and vigorously agitating for 15 minutes. From this emulsion a dilute latex containing 5% solids was formed by steam stripping the solvent. The latex was concentrated by mixing with 10% of a 1% aqueous solution, based on the total volume of latex, of carboxymethylcellulose and allowed to stand overnight. Two layers formed. The bottom layer, essentially water, was removed leaving a latex containing 50.7% solids.

A coating color composition was prepared by adding 26.8 parts of a 25% aqueous starch solution to 80 parts of clay slip (70% solids) and agitating. After a smooth suspension was obtained, 6.6 parts of the above latex and a small amount of anticoagulant were added to yield a smooth coating color composition containing 18% adhesive, based on the clay, one-third of which was ethylene propylene copolymer. The composition contained 60% total solids.

A second coating color composition was prepared with the above copolymer latex as the sole adhesive. To 80 parts of a 70% clay slip was added 18.2 parts of the above latex and a small amount of anticoagulant. A smooth coating color composition containing 15% adhesive, based on the clay, was obtained. The composition contained 60% total solids.

Each of the compositions was applied to book-ledger raw stock at the rate of 8 lbs./ream, using a standard paper coating machine, and dried on a drum drier. The coated paper was conditioned for 24 hours at 72° F. and 50% relative humidity, then calendered and tested. Each coated paper showed improved printability, gloss, wet-rub resistance, and flexibility when compared to similar sheets coated with a conventional starch-clay coating color composition.

*Example 6*

An ethylene propylene copolymer latex was prepared using a mixed nonionic-anionic surface-active agent as follows: To 1000 parts of a 14% solution of ethylene propylene copolymer in a mixed aliphatic and alicyclic solvent (described in Example 2) was added 7 parts of oleic acid (anionic surface-active agent) with gentle heating. In a separate vessel 500 parts of water was mixed with 500 parts of methanol, and to the resulting solution was added 7 parts of a nonylphenol ethylene oxide nonionic surface-active agent and 1.4 parts of potassium hydroxide. This methanol-water solution was heated to just below the boiling point and then slowly added to the aliphatic-alicyclic solution with agitation. The resulting oil-in-water emulsion was stripped of organic solvent by azeotropic distillation (methanol acting as azeotropic agent) at 60° C. under a reduced pressure of 150 mm. of mercury. The resulting dilute latex was concentrated to 44% solids by the evaporation of water at elevated temperature and reduced pressure. The latex was evaluated in coating color compositions as described in Example 5. Paper coated with compositions containing the latex showed improved printability, gloss, wet-rub resistance, and flexibility when compared with similar sheets coated with a conventional starch-clay coating color composition.

What we claim and desire to protect by Letters Patent is:

1. A paper coating color comprising an aqueous dispersion of substantial quantities of a pigment and an adhesive, said adhesive containing at least 10% by weight of a latex of an ethylene propylene copolymer, said copolymer containing from about 20 to about 45 mole percent propylene and having a reduced specific viscosity of from about 1 to about 7.

2. The composition of claim 1 wherein said adhesive is a mixture of starch and at least 10% by weight of a latex of an ethylene propylene copolymer.

3. The composition of claim 1 wherein said adhesive is a mixture of casein and at least 10% by weight of a latex of an ethylene propylene copolymer.

4. The composition of claim 1 wherein said adhesive is essentially entirely a latex of an ethylene propylene copolymer.

5. In a process of coating paper, paperboard, and the like with a coating color comprising an aqueous dispersion of substantial quantities of a pigment and an adhesive, the improvement of using an adhesive containing at least 10% by weight of a latex of an ethylene propylene copolymer, said copolymer containing from about 20 to about 45 mole percent propylene and having a reduced specific viscosity of from about 1 to about 7.

6. A coated paper product comprising a paper web having on the surface a coating comprising a pigment and an adhesive, said adhesive containing at least 10% by weight of a latex of an ethylene propylene copolymer, said copolymer containing from about 20 to about 45 mole percent propylene and having a reduced specific viscosity of from about 1 to about 7.

References Cited by the Examiner

UNITED STATES PATENTS

| | | | |
|---|---|---|---|
| 2,313,144 | 3/1943 | Gomm | 260—29.6 |
| 2,449,489 | 9/1948 | Larson | 260—29.6 |
| 2,486,756 | 11/1949 | Murphy et al. | 260—29.6 |
| 2,699,432 | 1/1955 | Marra et al. | 260—29.6 |
| 2,700,663 | 1/1955 | Peters | 260—88.2 |
| 2,726,231 | 12/1955 | Field et al. | 260—88.2 |
| 2,773,053 | 12/1956 | Field et al. | 260—88.2 |
| 2,780,617 | 2/1957 | Zletz | 260—2.5 |
| 3,073,790 | 1/1963 | Bosoni | 260—29.6 |
| 3,143,537 | 8/1964 | Hegemeyer et al. | 260—88.2 |

FOREIGN PATENTS

| | | |
|---|---|---|
| 229,412 | 7/1960 | Australia. |
| 473,116 | 4/1951 | Canada. |
| 578,584 | 7/1946 | Great Britain. |

MURRAY TILLMAN, *Primary Examiner.*

LEON J. BERCOVITZ, *Examiner.*

H. L. SATZ, M. FOELAK, *Assistant Examiners.*